United States Patent Office 3,378,522
Patented Apr. 16, 1968

3,378,522
EPITHIO COMPOUNDS, THEIR PREPARATION
AND POLYMERS
Robert W. Martin, Walnut Creek, Calif., assignor to
Shell Oil Company, New York, N.Y., a corporation of
Delaware
No Drawing. Filed Nov. 29, 1961, Ser. No. 155,844
18 Claims. (Cl. 260—47)

ABSTRACT OF THE DISCLOSURE

Novel polyepithio compounds are disclosed. These compounds contain more than one

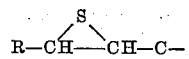

group, wherein R is hydrogen or a hydrocarbon radical, such as, for example, di(2,3-epithiopropyl)ether of 2,2-bis-(4-hydroxyphenyl)propane. Hard insoluble, infusible products obtained by reacting said novel polyepithio compounds with nucleophilic materials, are also disclosed.

This invention relates to a new class of epithio compounds and to a method for their preparation. More particularly, the invention relates to new epithio compounds prepared from polyepoxides, and to the utilization of the new epithio compounds, particularly in the formation of polymeric products.

Specifically, the invention provides new and particularly useful polyfunctional polyepithio compounds comprising compounds possessing more than one

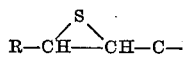

group wherein R is hydrogen or a hydrocarbon radical, such as, for example, di(2,3-epithiopropyl)ether of 2,2-bis-(4-hydroxyphenyl) propane. The invention further provides valuable polymeric materials obtained by reacting the new epithio compounds with nucleophilic materials, and preferably primary, secondary or tertiary amines.

As a special embodiment, the invention further provides derivatives of the new epithio compounds, and preferably those obtained by reacting the epithio compounds with drying oil acids, ammonia and hydrogen sulfide, and the use of these derivatives, particularly as curing agents for polyepoxides.

It is an object of the invention to provide a new class of compounds and a method for their preparation. It is a further object to provide new epithio compounds which can be prepared from polyepoxides. It is a further object to provide new epithio compounds which can be readily cured with catalytic amounts of nucleophilic materials. It is a further object to provide new epithio compounds which can be readily converted to insoluble infusible polymers. It is a further object to provide new and valuable polymers of epithio compounds. It is a further object to provide new derivatives of epithio compounds which are particularly useful as curing agents for polyepoxides. It is a further object to provide new polymercaptan derivatives of epithio compounds and a method for their preparation. It is a further object to prepare new drying oil esters from epithio compounds. It is a further object to provide new nitrogen-containing derivatives of epithio compounds. Other objects and advantages of the invention will be apparent from the following detailed description thereof.

It has now been discovered that these and other objects may be accomplished by the new epithio compounds of the present invention comprising compounds having more than one

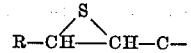

group wherein R is hydrogen or a hydrocarbon radical. It has been surprisingly found that these special compounds have an unexpectedly high degree of activity with nucleophilic materials, such as amines, and that when combined therewith even in catalytic amounts are converted to hard insoluble infusible polymeric materials. This property is quite surprising in view of the fact that the corresponding epoxy compounds are not so reactive and that when combined with catalytic amounts of amines, such as primary or secondary amines, require considerable time for curing. In addition, the new cured products of the invention have improved physical properties.

The new epithio compounds have also been found to be highly reactive to other materials, such as, for example, drying oil acids, ammonia hydrogen sulfide and the like. The products obtained from the reaction with hydrogen sulfide are particularly outstanding as they have been found to be very reactive curing agents for polyepoxides, particularly at the lower temperatures.

The new epithio compounds of the present invention are those compounds possessing more than one

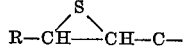

group. These compounds may be aliphatic, cycloaliphatic, aromatic or heterocyclic and may be saturated or unsaturated. They are preferably epithiohydrocarbons, epithioethers, epithioesters, epithiourethanes or epithioepoxides.

Examples of the new compounds include, among others, 4-(epithioethyl)1 - epithiocyclohexane, di(epithiopropyl) phthalate, epithiopropyl esters of polymerized unsaturated fatty acids, epithiopropyl esters of acrylic acids, tri(2,3-epithiopropyl) ether of glycerol, di(3,4-epithiobutyl) ether of diethylene glycol, di(2,3-epithiohexyl) ether of 1,4-butanediol, di(2,3-epithiocyclohexyl) ether of 1,5-pentanediol, di(3,4-epithiooctyl) ether of 1,6-hexanediol, tri(3,4-epithiohexyl) ether of 1,2,6-hexanetriol, di(2,3-epithiocyclohexyl) ether of sulfonyldipropanol, di(2,3-epithiopropyl) ether of 1,4-dimethylolbenzene, tri(2,3-epithiopropyl) ether of trimethylol propane, tetrakis(3,4-epithiooctyl) ether of pentaerythritol, poly(2,3-epithiopropyl) ether of polyallyl alcohol, di(3,4-epithiocyclohexyl) ether of 1,5-cyclopentanediol, di(3,4-epithiododecyl) ether of ethylene glycol, di(2,3-epithiotridecyl) ether of polyoxyethylene glycol having a mol weight of about 400, di(2,3-epithiododecyl) ether of resorcinol, di(3,4-epithiohexyl) ether of resorcinol, tri(3,4-epithiohexyl) ether of 1,3,5-trihydroxybenzene, tri(2,3-epithiodecyl) ether of 1,2,4-trihydroxybenzene, di(2,3-epithiocyclohexyl) ether of resorcinol, di(2,3-epithiopropyl) ether of 2,2-bis(4-hydroxyphenyl)butane, tetrakis(2,3-epithiopropyl) ether of 1,1,2,2-tetra(4-hydroxyphenyl)ethane, tetrakis(3,4-epithiododecyl) ether of 1,1,5,5-tetra(4-hydroxyphenyl)pentane, di(2,3-epithiopropyl) ether of 2,2-bis(4-hydroxyphenyl)sulfone, di(2,3-epithiopropyl) ether of 2,2-bis(4-hydroxyphenyl) methane, di(2,3-epithiopropyl) ether of 2,2-bis(4-hydroxy-3-tert-butylphenyl)propane, di(2,3-epithiopropyl) ether of 2,2-bis(4-hydroxy-5-methoxyphenyl) 1,1-dichloropropane, and the like.

Preferred compounds of the invention include the epithioalkyl and epithiocycloalkyl ethers of polyhydric alcohols and polyhydric phenols, and preferably those containing less than 40 carbon atoms. Coming under special consideration are the ethers of the epithioalkanols and epithiocycloalkanols which contain from 2 to 12 carbon atoms and have the epithio group not more than 5 carbon atoms removed from the OH group, and polyhydric alcohols as alkanepolyols containing from 2 to 15 carbon atoms and from 2 to 4 hydroxyl groups, and polyhydric phenols as unsubstituted mononuclear and polynuclear polyhydric phenols containing from 2 to 35 carbon atoms.

Of special interest are those compounds of the formula

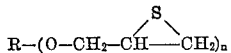

wherein R is derived from a polyhydric phenol or polyhydric alcohol by removing the OH group, and $n$ is an integer and preferably 2 to 6.

The new epithioethers of the present invention can be prepared by a variety of methods. They can be prepared, for example, by thermal dehydration of the corresponding hydroxy-mercaptans, treatment of corresponding 1,2-chlorothiols with weakly alkaline solution, or by reacting the corresponding ethylenically unsaturated ether with sulfur or a compound that liberates sulfur, such as dialkyl polysulfide and heating the resulting mixture.

The new epithio compounds are preferably prepared by reacting the corresponding epoxy ether with a thiocyanate, such as ammonium thiocyanate or a metal thiocyanate as potassium thiocyanate. The corresponding epoxy compounds with a thiocyanate, such as ammonium having the same structure as the above-noted epithio compounds with the exception that they have a

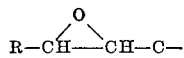

group in place of the epithio group. Such compounds may be saturated or unsaturated, aliphatic, cycloaliphatic, aromatic or heterocyclic and may be substituted with halogen atoms, ether and ester groups. Examples of such epoxy compounds may be found in U.S. Pat. 2,956,034 and include, among others, triglycidyl ether of glycerol, triglycidyl ether of 1,2,6-hexanetriol, triglycidyl ether of 1,2,6-dodecanetriol, diglycidyl ether of ethylene glycol, diglycidyl ether of 1,5-pentanediol, diglycidyl ether of sulfonyldipropanol, triglycidyl ether of trimethylolpropane, tetrakisglycidyl ether of pentaerythritol, polyglycidyl ether of polyallyl alcohol, diglycidyl ether of resorcinol, triglycidyl ether of 1,3,5-trihydroxybenzene, diglycidyl ether of 2,2-bis(4-hydroxyphenyl)propane, diglycidyl ether of 2,2-bis(4-hydroxyphenyl)pentane, tetrakisglycidyl ether of 1,1,5,5-tetra(4-hydroxyphenyl)pentane and the like.

A preferred group of polyepoxides include the monomeric and polymeric glycidyl polyethers of polyhydric phenols, such as obtained by reacting epichlorohydrin with a polyhydric phenol in an alkaline medium. The monomeric products of this type may be represented by the general formula $$CH_2\text{---}CH\text{---}CH_2\text{---}O\text{---}R\text{---}O\text{---}CH_2\text{---}CH\text{---}CH_2$$

wherein R represents a divalent radical obtained from the polyhydric phenol by removing two of the OH groups. The polyhydric phenols which may be used in preparing such glycidyl ethers may be exemplified by resorcinol, catechol, 2,2 - bis(4 - hydroxyphenyl)propane, 1,3,5-trihydroxybenzene, 2,2-bis(4-hydroxyphenyl)pentane, di(4-hydroxyphenyl)methane, and di(4-hydroxyphenyl)sulfone and the like.

The preparation of a glycidyl ether of the above-described type may be illustrated by the following:

POLYETHER A

About 2 mols of bis-phenol was dissolved in 10 mols of epichlorohydrin and 1% to 2% water added to the resulting mixture. The mixture was then brought to 80° C. and 4 mols of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value of 0.50 eq./100 g., and an epoxy equivalency of 1.75.

The glycidyl polyethers prepared by the above-described process are generally not simple compounds but complex mixtures. They can, however, be separated into relatively pure crystalline products by suitable crystallization procedure. A method illustrating this technique is shown below.

POLYETHER B

The resinous product identified as Polyether A above was distilled in a wiped film evaporator type of vacuum still. A liquid product having a viscosity at 25° C. of 55 was obtained. 232 parts of this distilled material was dissolved in 931 parts of methyl alcohol at 30° C. to produce a saturated resin in alcohol. One part of previously obtained seed crystals of a pure diglycidyl ether was added to the solution and the solution was then gradually cooled in an ice bath at a temperature of 10° C. over a period of about two hours. The resulting crystals were removed by filtration. The crystals were identified as substantially pure diglycidyl ether of 2,2-(4-hydroxyphenyl) propane.

Polymeric glycidyl polyethers of polyhydric phenols may be obtained by varying the proportion of the epichlorohydrin and polyhydric phenol. These materials will also not be sample molecules but will be a complex mixture of the glycidyl polyethers. They may be represented by having the general formula

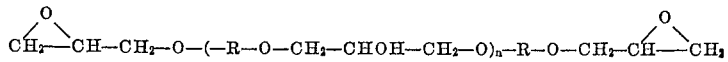

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value of $n$ to be an average which is not necessarily zero or a whole number. The polyethers may, in some cases, contain a very small amount of material with one or both of the terminal glycidyl radicals in hydrated form.

The preparation of one of these polymeric glycidyl polyethers is illustrated below.

POLYETHER C

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C., in 80 minutes, and cooled rapidly. At room temperature, the product was an extremely viscous semi-solid having a melting point of 27° C. by Durrans' Mercury Method and a molecular weight of 483. The product had an epoxy value of 0.40 eq./100 g. and an epoxy equivalency of 1.9. For convenience, this product will be referred to as Polyether C.

Particularly preferred members of the above-described group are the glycidyl polyethers of the dihydric phenols, and especially the 2,2-bis(4-hydroxyphenyl)alkanes, having an epoxy equivalency between 1.1 and 2.0 and a molecular weight between 300 and 900. Particularly preferred are those having a Durrans' Mercury Method softening point below about 60° C.

The glycidyl polyethers of polyhydric phenols obtained by condensing the polyhydric phenols with epichlorohydrin are also referred to as "ethoxylene" resins. See Chemical Week, vol. 69, page 27, for Sept. 8, 1951.

Another preferred group of epoxy ethers include the glycidyl polyethers obtained by reacting polyhydric alcohols with epichlorohydrin, preferably in the presence of 0.1% by 0.5% by weight of an acid acting compound, such as boron trifluoride, hydrofluoric acid, stannic chloride or stearic acid. This reaction is preferably effected at 50° C. to 170° C. with the proportions of reactants being such that there is about one mole of epichlorohydrin for every equivalent of hydroxy group to be reacted. The resulting chlorohydrin ether is then dehydrochlorinated by heating at 50° C. to 125° C. with a small e.g. 10% stoichiometrical excess of base, such as sodium aluminate.

The preparation of one of these preferred polyglycidyl ethers of polyhydric alcohols may be illustrated by the following example showing the preparation of a glycidyl polyether of glycerol.

POLYETHER D

About 276 parts (3 moles) of glycerol was mixed with 10 parts of diethyl ether solution containing about 4.5% boron trifluoride. 832 parts of epichlorohydrin was then added dropwise. The temperature of this mixture was between 50° C. and 75° C. for about 3 hours. About 370 parts of the resulting glycerol-epichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature about 150° C. at 20 mm. pressure. The polyglycidyl ether, in amount of 261 parts, was a pale yellow, viscous liquid. It had an epoxide value of 0.671 equivalent per 100 grams and the molecular weight was 324 as measured ebullioscopically in dioxane solution. The epoxy equivalency of this product was 2.13. For convenience, this product will be referred to hereinafter as Polyether D.

Other examples include the polymers and copolymers of allylic ethers of epoxy containing alcohols. When this type of monomer is polymerized in the substantial absence of alkaline or acidic catalysts, such as in the presence of heat, oxygen, peroxy compounds, actinic light, and the like, they undergo additional polymerization at the multiple bond leaving the epoxy group unaffected. These allylic ethers may be polymerized with themselves or with other ethylenically unsaturated monomers, such as styrene, vinyl acetate, methacrylonitrile, acrylonitrile, vinyl chloride, methyl acrylate, methyl methacrylate, diallyl phthalate, vinyl allyl phthalate, divinyl adipate, 2-chloroallylacetate, and vinyl methallyl pimelate. Illustrative examples of these polymers include poly(allyl 2,3-epoxypropyl ether), allyl 2,3-epoxypropyl ether-styrene copolymer, methallyl 3,4-epoxybutyl ether-allyl benzoate copolymer, poly(vinyl 2,3-epoxypropyl)ether and an allyl glycidyl ether-vinyl acetate copolymer.

The thiocyanates employed in the reaction with the polyepoxide include inorganic thiocyanates such as, for example, ammonium thiocyanate and the alkaline earth metal thiocyanate such as sodium and potassium metal thiocyanate.

The amount of the epoxy compounds and the thiocyanate to be used in the process may vary over a wide range. It is preferred to employ an excess of the thiocyanate. Still more preferably, the polyepoxide and the thiocyanate are combined in equivalent ratios varying from 1:1 to 1:1.5 and equivalent amount as used herein in reference to the polyepoxide and thiocyanate refers to that amount of thiocyanate needed to furnish one thiocyanate group for every epoxy group to be converted.

The temperature employed in the process will depend upon the reactivity of the polyepoxide with the thiocyanates. In general, the polyepoxides are quite reactive with the polythiocayanates and it is preferred to employ a low reaction temperature, generally ranging from about −10° C. to room temperature. Still more preferred temperatures range from 10–20° C. Atmospheric, superatmospheric or subatmospheric temperatures may be utilized.

The reaction may be conducted in the absence of the solvents and diluents but in view of the inorganic nature of the thiocyanate it is generally preferred to employ a common polymer solvent, such as, for example, water, alcohol and the like.

The new epithio compounds may be recovered from the reaction mixture by any suitable means, such as extraction, distillation, precipitation and the like. It is generally preferred to recover the products by extraction with ether and then evaporation of the ether from the resulting product.

The new epithio compounds of the present invention will vary from fluid liquids to solid materials. The molecular weights of the materials will also vary depending on the epoxy ether from which they are derived. The products, for example, derived from the polymeric high molecular weight epoxy ethers, such as those having molecular weights from say 1000 to 10,000, will also have molecular weights in this range. The new epithioethers are also soluble in various organic solvents, such as alcohols, ethers, ketones and the like, and are compatible with various oils, resins, asphalts, tars synthetic resins as alkyd resins, polyepoxides and the like.

The new epithio compounds also possess more than one epithio group which is quite highly reactive and the products may react with a great variety of materials to form new and valuable products.

The new epithio compounds are particularly valuable in that they react readily with nucleophilic materials, such as acids, anhydrides, mercaptans, thiocyanates, metal salts and amines to form hard cross-linked insoluble infusible polymers. Nucleophilic materials which may be employed may be exemplified by the following: phthalic anhydride, succinic anhydride, pyromellitic anhydride, trimellitic anhydride, isophthalic anhydride, tetrachlorophthalic anhydride, tetrahydrophthalic anhydride, adipic acid, oxalic acid, phosphoric acid, toluene sulfonic acid, phthalic acid, sebacic acid, dodecadienedioic acid, eicosanedioic acid chlorendic acid, cyclohexane dicarboxylic acid, 1,5-pentanedithiol, 1,4-butanedithiol, 1,4-cyclohexanedithiol, zinc chloride, aluminum chloride, copper chloride, zinc sulfate, aluminum sulfate, zinc sulfate, zinc nitrate, magnesium perchlorate, amines such as propylamine, octylamine, dodecylamine, octadecylamine, cyclohexylamine, aniline, allylamine, cyclohexenylamine, ethylene diamine, 1,4-butanediamine, 1,6-hexanediamine, o,p- and m-phenylene diamine, 1,8-octadiamine, 3,3'-diphenyldiamine, 1,4-naphthalenediamine, 1,2,3 - benzenetriamine, diethylene triamine, triethylene tetramine, tripropylene tetramine, heptaethylene octamine, 1,2-diamino - 2 - methylpropane, 2,3-diamino - 2 - methylbutane, 2,4-diamino-2-methylpentane, diethylaminopropylene, methylene dianiline, di-(aminophenyl)sulfone, and adducts of these amines with polyepoxides such as may be obtained by reacting anyone or more of the above-described polyepoxides with an excess of an amine containing a replaceable hydrogen attached to nitrogen.

The amount of the nucleophilic materials used in curing the epithio ethers may vary over a wide range. The amount used is generally very small and may be as small or smaller than 0.01% based on the weight of the epithio ether. In general, the amount of the nucleophilic material will vary from about 0.1% to 10% by weight of the epithio ether.

The curing of the new epithio compounds may be accomplished by merely bringing the said material in contact with the nucleophilic material as by stirring, shaking or otherwise mixing the components. The temperature employed may vary over a wide range. In general, the reaction takes place at room temperature and there is no need to apply heat. However, heat may be applied to speed the rate of cure. Temperatures preferably used vary from about 50° C. to 150° C.

It may be desirable, in some cases, to employ solvents or diluents. This is particularly true if one or more of the reactants are solids or thick liquids. Suitable solvents or diluents include, among others, ketones like acetone, methyl ethyl ketone, methyl isobutyl ketone, isophorone, etc. esters such as ethyl acetate, butyl acetate, Cellosolve acetate (ethylene glycol monoacetate), methyl Cellosolve acetate (acetate of ethylene glycol monomethyl ether), etc.; ether alcohols, such as methyl, ethyl or butyl ethers of ethylene glycol or diethylene glycol; chlorinated hydrocarbons, such as trichloropropane, chloroform, etc. may also be employed. To save expense, these active solvents may be used in admixture with aromatic hydrocarbons, such as benzene, toluene, xylene, etc., and/or alcohols such as ethyl, isopropyl, or n-butyl alcohol. Solvents which remain in the cured compositions may also be used, such as diethyl phthalate or monoepithio compounds, such as, for example, epithio-substituted hydrocarbons, epithio-substituted ethers and esters, such as epithiocyclohexane, epithiopropylphenyl ether, epithiopropyl butyl ether, epithiopropyl allyl ether, and the like, as well as liquid monoepoxides, such as glycidyl allyl ether, glycidyl phenyl ether, styrene oxide and the like, as well as cyano-substituted hydrocarbons.

The new polyepithio compounds may also be combined with and/or coreacted with many other materials. This includes one or more of the above-described polyepoxides, polyurethanes, phenol-aldehyde resins, urea-formaldehyde or melamine-formaldehyde resins, alkyd resins, polythiopolymercaptans, polyaldehydes, polyols, such as polyallyl alcohol and polyvinyl alcohol, various synthetic oils, bituminous, tars, and the like, as well as with various types of plasticizers, stabilizers, fillers, as sand, aggregate, and the like.

The new epithio ethers in combination with the above-described nucleophilic materials may be utilized in a great many important industrial applications. They may be used, for example, in the preparation of coating and surfacing compositions, in the preparation of crease and shrink proof agents for textile materials, as impregntaing agents and water proofing agents, and in the formation of adhesive compositions and laminating compositions.

If the new epithio ethers are to be used in the preparation of castings or pottings, the nucleophilic material and epithio ether are generally combined together and then poured into the desired mold or casting containing the desired electrical wires or apparatus and the mixture allowed to cure.

The new epithio ethers are particularly suited for use in making surfacing compositions. In this application, they may be combined with the desired nucleophilic curing agent and any suitable additive, such as synthetic resins, oils and the like, driers, plasticizers, stabilizers and the like, and the mixture then spread out as a thin film and allowed to dry. Film-forming materials that are preferably used with the epithio ethers include, among others, drying oils, such as tung oil, linseed oil, dehydrated castor oil, soybean oil, and the like; cellulose derivatives as cellulose nitrate, cellulose propionate, ethyl cellulose, vinyl polymers, such as polymers of vinyl chloride, vinylidene chloride, methyl methacrylate, diallyl phthalate, and the like, as well as various tars, asphalts, lignin resins and the like.

The new epithio ethers may also be used in the preparation of valuable adhesives and laminating compositions. In utilizing the new epithio ethers for these applications, it is generally desirable to combine the epithio ether with the desired solvent or diluent, or with the desired filler so as to form a spread paste or adhesive, and then adding the curing agent and applying the mixture to the desired surface. Materials that may be adhered together by the adhesives include, among others, metal, glass, wood, cement, asphalt, ceramics, plastics and the like.

The new epithio ether may also be used to prepare new and valuable derivatives. They may be reacted, for example, with many monofunctional or polyfunctional reactants, such as acids, amines, ammonia, mercaptans, and the like to produce valuable monomeric materials which find side use in industry. When reacting with nucleophilic materials, such as described hereinabove, which turned to form cross-linked polymers, it is generally preferred to add the epithio ether to large quantities of the reactants so as to favor the derivative-forming reaction rather than the cross-linking reaction.

Valuable derivatives useful in the preparation of surface coatings may be obtained by reacting the above-described epithio ethers with unsaturated acids and preferably the ethylenically unsaturated fatty acids such as may be derived from semi-drying oils. The preferred acids employed for this purpose include the unsaturated fatty acids containing from 12 to 36 carbon atoms and having an iodine number of 85 or higher. Suitable acids having at least one ethylenic group include, among others, oleic acid, lauroleic acid, palmitoleic acid, linoleic acid, linolenic acid, and the like and mixtures of fatty acids as may be obtained by hydrolysis of natural drying oils as linseed oil, soybean oil, dehydrated castor oil, perilla oil, and the like.

Particularly preferred derivatives are also obtained by reacting the epithio ethers with ammonia or amines. The amine derivatives are preferably obtained by adding the epithio ether to an excess of the amine or a solvent solution of the amine.

Particularly valuable derivatives are also obtained by reacting the epithio ethers with mercaptans and particularly hydrogen sulfide. This is preferably accomplished by passing the epithio ether to an excess of the mercaptans or to solutions of hydrogen sulfide. The temperature employed in this reaction will generally vary from 10° C. to 150° C. The products may be recovered from the reaction mixture by any suitable means such as by extraction, filtration, distillation and the like.

The hydrogen sulfide derivatives which are characterized by having —SH groups attached to adjacent carbon atoms and in the case of the polyepithio ethers having at least four such mercaptan groups are particularly suitable for use as curing agents for polyepoxides. When used alone or particularly in combination with amines these products react rapidly at low temperatures to convert the polyepoxides into hard insoluble infusible products. The polyepoxides used for this purpose may be any compound containing more than one vic-epoxy group. Examples of these materials include those epoxy ethers described above as well as various other materials such as glycidyl esters, epoxidized unsaturated drying oils, epoxidized ethylenically unsaturated hydrocarbons and the like.

To illustrate the manner in which the invention may be carried out the following examples are given. It is to be understood, however, that the examples are for the purpose of illustration and the invention is not to be regarded as limited to any of the specific conditions or reactants cited therein. Unless otherwise specified parts described in the examples are parts by weight.

Example I

This example illustrates the preparation and some of the properties of di(2,3-epithiopropyl)ether of 2,2-bis(4-hydroxyphenyl) propane.

100 parts (0.29 mole) of Polyether B described above with 56 parts (0.7 mole) of ammonium thiocyanate in 1500 parts of ethyl alcohol. This mixture was stirred at room temperature (25° C.) for 48 hours. The alcohol solvent was then evaporated under vacuum and the solid resin was extracted under chloroform. The extract was then washed with water and then dried. Evaporation of the chloroform gave a colorless viscous liquid which slowly crystallized. The crystalline product had a melting point of 70–75° C. Analysis S theory 17.2, found 16.5.

Two parts of diethyl amino propyl amine was mixed with 100 parts of the above-described epithio ether and the mixture heated at 100° C. At that time, the mixture had set up to form a hard insoluble infusible product. The product had a Barcol hardness of 35 and was insoluble in acetone and benzene.

In a related experiment two parts of the same curing agent was mixed with 100 parts of the corresponding polyepoxide, i.e., diglycidyl ether of 2,2-bis(4-hydroxyphenyl)propane and mixture heated at 170° C. for one hour. The product in this case had not cured but had set up to a gelled material. The product was easily soluble in acetone and benzene.

A comparison of the above two experiments indicates that the new epithio compounds can be readily cured with catalytic amounts of amines while the polyepoxides required much larger amounts of the curing agent.

Example II 100 parts of Polyether A described above was combined with 56 parts of ammonium thiocyanate and 1500 parts of ethyl alcohol. This mixture was stirred at room temperature (25° C.) for 48 hours. The alcohol solvent was evaporated under vacuum at 75° C. and the residue was extracted with chloroform. The extract was washed with water and then dried. Evaporation of the chloroform gave a yellow viscous liquid. Analysis calculated sulfur 16.6, found 16.0.

2 parts of diethyl amino propyl amine was combined with 100 parts of the above described product and the mixture heated at 100° C. for one hour. At that time the mixture had set up to form a hard insoluble infusible product.

2 parts of metaphenylene diamine was combined with 100 parts of the above described epithio compound and the mixture heated at 100° C. for several hours. At that time the mixture had set up to a hard infusible insoluble product.

Example III

This example illustrates the preparation and some of the properties of di(2,3-epithiopropyl)ether.

130 parts (1.0 mole) of diglycidyl ether was combined with 242 parts (2.5 moles) of potassium thiocyanate in the mixture of 75 parts of ethyl alcohol and 200 parts of water. This mixture was stirred continuously at 0° C. for about 24 hours. At this time, the mixture was diluted with 500 parts of water and the product extracted with ether. The ethereal extract was washed with water and then dried over anhydrous sodium sulfate. The evaporation of the ether gave 130 parts of a colorless liquid identified as di-(2,3-epithiopropyl)ether.

2 parts of diethylene triamine was combined with 100 parts of the above-described product and the mixture allowed to stand at room temperature. In a short while the mixture had set up to form a hard insoluble infusible product.

In a similar experiment two parts of diethylene triamine was combined with 100 parts of a corresponding polyepoxide diglycidyl ether. In this case the mixture did not cure even after several days of standing.

Example IV

This example illustrates the preparation and properties of di(2,3-ethylthiopropyl)ether of resorcinol.

1 mole of diglycidyl ether of resorcinol was combined with 2.5 moles of potassium thiocyanate in 1500 parts of ethyl alcohol. This mixture was stirred at room temperature for 48 hours. The alcohol solution was then evaporated and the residue extracted with chloroform. The extract was washed with water, dried and then the chloroform evaporated to yield a colorless and viscous liquid identified as di(2,3-epithiopropyl)ether of resorcinol.

2 parts of N-ethyl piperazine was combined with 100 parts of the above-identified product and the mixture heated at 100° C. for one hour. The resulting product was a hard insoluble infusible resin.

Example V

This example illustrates the preparation and some of the properties of a tri(2,3-epithiopropyl)ether of glycerol.

1 mole of triglycidyl ether of glycerine was combined with 3.5 moles of ammonium thiocyanate in 1500 parts of ethyl alcohol. This mixture was stirred at room temperature for 48 hours. The alcohol solution was then evaporated under vacuum and residue extracted with chloroform. The extract was washed with water, dried and then the chloroform evaporated. The resulting product was a colorless liquid identified as the tri(2,3-epithiopropyl)ether of glycerine.

2 parts of N-hydroxyethyl(diethylene triamine) was combined with 100 parts of the above product and the mixture heated at 100° C. for several hours. At that time the product was a hard insoluble infusible resin.

Example VI

The process in Example V was repeated with the exception that the triglycidyl ether of glycerine was replaced by a triglycidyl ether of hexane triol. An epithio ether having related properties was obtained.

Example VII 100 parts of a polymer of allyl glycidyl ether having a molecular weight of about 1000 was combined with an equivalent amount of potassium thiocyanate in 2000 parts of ethyl alcohol. This mixture was stirred at room temperature for 48 hours. The alcohol solution was then evaporated and the residue extracted with chloroform. The extract was then washed with water, dried and the chloroform evaporated. The resulting product was a colorless viscous liquid identified as a polymer of allyl 2,3-epithiopropyl ether.

2 parts of diethyl amino propyl amine was combined with 100 parts of the above-identified polymer and the mixture heated to 100° C. for one hour. At that time the mixture had set up to form a hard insoluble infusible product.

Example VIII

This example illustrates the preparation and some of the properties of 2,3-epithiopropyl ether of a novolac resin.

100 parts of a polyglycidy ether of a novolac resin obtained by reacting phenol with formaldehyde was combined with 75 parts of potassium thiocyanate in 2000 parts of ethyl alcohol. This mixture was stirred at room temperature for 48 hours. The alcohol solvent was then evaporated and the residue extracted with chloroform. The extract was washed with water and dried. Evaporation of the chloroform gave a high viscous liquid identified as a poly-(2,3-epithiopropyl)ether of the novolac resin.

3 parts of diethylene triamine was combined with 100 parts of the above-identified epithioether and the mixture allowed to stand at room temperature for several hours. The resulting product was a hard insoluble infusible resin.

Example IX

This example illustrates the preparation and some of the properties of di(2,3-epithiopropyl)ether of 2,2-bis(4-hydroxy-3-allylphenyl)propane.

1 mole of the diglycidyl ether of 2,2-bis(4-hydroxy-3-allylphenyl)propane was combined with 2.5 moles of ammonium thiocyanate in 2000 parts of ethyl alcohol; this mixture was stirred at room temperature for 48 hours. The alcohol solvent was then evaporated and the residue extracted with chloroform. The extract was washed and dried. The evaporation of chloroform gave a viscous liquid identified as di(2,3-epithiopropyl)ether of 2,2-bis(4-hydroxy-3-allylphenyl)propane.

3 parts of metaphenylene diamine and 100 parts of the above described compound was mixed and heated at 150° C. for one hour. At that time the mixture had set up to a hard insoluble infusible product.

Example X 100 parts of the di(2,3-epithiopropyl)ether produced in Example III was saturated with an excess of hydrogen sulfide. The product that was recovered was identified as di(2,3-dimercaptopropyl) ether. This material was combined in an equivalent amount with Polyether A identified above. This mixture set up in a short while at room temperature to form a hard insoluble infusible product.

Example XI

Process in Example X was repeated with the exception that the epithio ether employed was di(2,3-epithiopropyl)ether of 2,2-bis(4-hydroxyphenyl)propane. Related results are obtained.

Example XII 50 parts of the di(2,3-epithiopropyl) ether of 2,2-bis-(4-hydroxyphenyl)propane produced above was combined with 50 parts of butyl glycidyl ether. 1 part of diethylene triamine was added and the mixture stirred at room temperature. In a short while, the mixture had set up to a hard insoluble infusible product.

Example XIII

The preceding example was repeated with the exception that the butyl glycidyl ether was replaced with butyl 2,3-epithiopropyl ether. Related results are obtained.

Example XIV

Example XII was repeated with the exception that the butyl glycidyl ether was replaced with phenyl 2,3-epithiopropyl ether. Related results are obtained.

Example XV

Example XII is repeated with the exception that the butyl glycidyl ether is replaced with epithiocyclohexane. Related results are obtained.

Less desirable materials, but ones which are particularly suited for use as diluents for polyepoxides as described above are the monoepithio compounds and particularly the monoepithio ethers, esters and ether esters as, for example, 2,3-epithiopropyl ether of butanol, phenol, cyclohexanol, octanol, allyl alcohol, vinyl alcohol, amyl alcohol, tertiary butyl alcohol and the like, and monocarboxylic acid esters of 2,3-epithiopropanol.

Example XVI

This example illustrates the preparation of

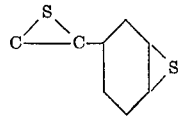

A solution containing 34.3 parts of 4-vinylcyclohexene diepoxide, 125 parts of methanol and 49.7 parts of KSCN was charged to a 500 parts, 4 neck flask equipped with a stirrer, condenser and thermometer. The reaction mixture was stirred rapidly and the temperature was maintained at 60° C. for 1 hour. The solution was then poured into ice and the organic layer was extracted with chloroform, washed twice with water and dried. The chloroform was stripped off and the organic layer which remained in the kettle was distilled. The diepithio compound recovered in 77% yield had 25.3% by weight sulfur.

Example XVII

Example XVI is repeated with the exception that the 4-vinylcyclohexene diepoxide is replaced with 2,2,-bis-(3-cyclohexenyl)propane, dicyclohexenyl ether of 1,4-butanediol, and arcrylic acid ester of propylene glycol. Related results are obtained.

Example XVIII

Example XVI is repeated with the exception that the 4-vinylcyclohexene diepoxide is replaced with diglycidyl ester of dimerized linoleic acid. Related results are obtained.

Also included within the scope of this invention are those compounds which have at least one

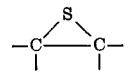

group and at least one

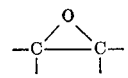

group as may be obtained by a partial replacement of the epoxy oxygen atom with sulfur in the above-noted reaction process. This can be done by control of the amount of thiocyanate reactant. Examples include the above noted compounds wherein at least one of the epoxy groups remain as such.

I claim as my invention:

1. A hard insoluable infusible product, which does not melt on heating, obtained by heating as sole reactants a curing amount of a nucleophilic material of the group consisting of carboxylic acids, carboxylic acid anhydrides, inorganic metal salts of zinc, aluminum, copper or magnesium, and aliphatic or aromatic mono or polyamines, with a polysulfur-containing compound possessing more than one

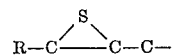

group wherein R is a member of the group consisting of hydrogen atom and hydrocabon radicals.

2. Polyepithio compounds of the group consisting of
   (1) polyepithioalkyl esters,
   (2) polyepithioalkyl ethers of polyhydric alcohols,
   (3) polyepithioalkl ethers of polyhydric phenols,
   (4) di(epithioalkyl) ethers,
   (5) compound of the formula

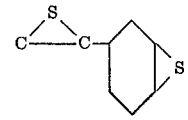

(6) compound of the formula

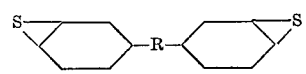

wherein R is an aliphatic hydrocarbon.

3. A hard insoluble infusible product, which does not melt on heating, obtained by heating as sole reactants a curing amount of nucleophilic material of the group consisting of carboxylic acids, carboxylic acid anhydrides, inorganic metal salts of zinc, aluminum, copper or magnesium, and aliphatic or aromatic mono or polyamines, with an epithio alkyl ester possessing more than one epithioalkyl group.

4. A hard insoluble infusible product, which does not melt on heating, obtained by heating as sole reactants a curing amount of a nucleophilic material of the group consisting of carboxylic acids, carboxylic acid anhydrides, inorganic metal salts of zinc, aluminum, copper or magnesium, and aliphatic or aromatic mono or polyamines, with an epithioalkyl ether of a polyhydric alcohol, possessing more than one epithioalkyl ether group.

5. A hard insoluble infusible product, which does not melt on heating, obtained by heating as sole reactants a curing amount of a nucleophilic material of the group consisting of carboxylic acids, carboxylic acid anhydrides, inorganic metal salts of zinc, aluminum, copper or magnesium, and aliphatic or aromatic mono or polyamines, with an epithioalkyl ether of a polyhydric phenol possessing more than one epithioalkyl ether group.

6. A hard insoluble infusible product, which does not melt on heating, obtained by heating as sole reactants a curing amount of a nucleophilic material of the group consisting of carboxylic acids, carboxylic acid anhydrides, inorganic metal salts of zinc, aluminum, copper or magnesium, and aliphatic or aromatic mono or polyamines, with a 2,3-epithiopropyl ether of a polyhydric alcohol containing from 2 to 6 OH groups and from 2 to 35 carbon atoms wherein the compound posses more than one 2,3-epithiopropyl ether group.

7. A hard insoluble infusible product, which does not melt on heating, obtained by heating as sole reactants a curing amount of a nucleophilic material of the group consisting of carboxylic acids, carboxylic acid anhydrides, inorganic metal salts of zinc, aluminum, copper or magnesium, and aliphatic or aromatic mono or polyamines, with a 2,3-epithiopropyl ether of a polyhydric phenol containing from 2 to 6 OH groups and from 6 to 40 carbon atoms wherein the compound possesses more than one 2,3-epithiopropyl ether group.

8. A had insoluble infusible product, which does not melt on heating, obtained by heating as sole reactants a curing amount of a nucleophilic material of the group consisting of carboxylic acids, carboxylic acid anhydrides, inorganic metal salts of zinc, aluminum, copper or magnesium, and aliphatic or aromatic mono or polyamines, with a di(epithioalkyl)ether.

9. A hard insoluble infusible product, which does not melt on heating, obtained by heating as sole reactants a curing amount of a nucleophilic material of the group consisting of carboxylic acids, carboxylic anhydrides, inorganic metal salts of zinc, aluminum, copper or magnesium, and aliphatic or aromatic mono or polyamines, with a di(epithioalkyl)ether of an alkane polyol.

10. A hard insoluble infusible product, which does not melt on heating, obtained by heating as sole reactants a curing amount of a nucleophilic material of the group consisting of carboxylic acids, carboxylic acid anhydrides, inorganic metal salts of zinc, aluminum, copper or magnesium, and aliphatic or aromatic mono or polyamines, with a di(epithioalkyl)ether of a dihydric phenol.

11. A hard insoluble infusible product, which does not melt on heating, obtained by heating as sole reactants a curing amount of a nucleophilic material of the group consisting of carboxylic acids, carboxylic acid anhydrides, inorganic metal salts of zinc, aluminum, copper or magnesium, and aliphatic or aromatic mono or polyamines, with a di(2,3-epithiopropyl)ether of 2,3-bis(4-hydroxyphenyl)propane.

12. A hard insoluble infusible prouct, which does not melt on heating, obtained by heating as sole reactants a curing amount of a nucleophilic material of the group consisting of carboxylic acids, carboxylic acid anhydrides, inorganic metal salts of zinc, aluminum, copper or magnesium, and aliphatic or aromatic mono or polyamines, with a di(2,3-epithiopropyl)ether or resorcinol.

13. A hard insoluble infusible product, which does not melt on heating, obtained by heating as sole reactants a curing amount of a nucleophilic material of the group consisting of carboxylic acids, carboxylic acid anhydrides inorganic metal salts of zinc, aluminum, copper or magnesium, and aliphatic or aromatic mono or polyamines, with a polyepithiopropyl ether of a novolac resin from a phenol and formaldehyde.

14. A hard insoluble infusible product, which does not melt on heating, obtained by heating as sole reactants a curing amount of a nucleophilic material of the group consisting of carboxylic acids, carboxylic acid anhydrides, inorganic metal salts of zinc, aluminum, copper or magnesium, and aliphatic or aromatic mono or polyamines, with a compound of the formula:

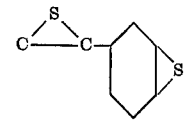

15. A hard insoluble infusible product, which does not melt on heating, obtained by heating as sole reactants a curing amount of a nucleophilic material of the group consisting of carboxylic acids, carboxylic acid anhydrides, inorganic metal salts of zinc, aluminum, copper or magnesium, and aliphatic or aromatic mono or polyamines, with a compound of the formula:

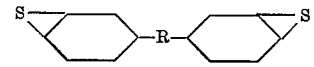

wherein R is an aliphatic hydrocarbon.

16. A hard insoluble infusible product, which does not melt on heating, obtained by heating as sole reactants a curing amount of a nucleophilic material of the group consisting of carboxylic acids, carboxylic acid anhydrides, inorganic metal salts of zinc, aluminum, copper or magnesium, and aliphatic or aromatic mono or polyamines, with a di(2,3-epithiopropyl)ether.

17. A hard insoluble infusible product, which does not melt on heating, obtained by heating as sole reactants a curing amount of a nucleophilic material of the group consisting of carboxylic acids, carboxylic acid anhydrides inorganic metal salts of zinc, aluminum, copper or magnesium, and aliphatic or aromatic mono or polyamines, with a di(2,3-epithiopropyl)ether of glycerol.

18. A hard insoluble infusible product, which does not melt on heating, obtained by heating as sole reactants a curing amount of nucleophilic material of the group consisting of carboxylic acids, carboxylic acid anhydrides, inorganic metal salts of zinc, aluminum, copper or magnesium, and aliphatic or aromatic mono or polyamines, with solid crystals of di(2,3-epithiopropyl)ether of 2,2-bis(4-hydroxyphenyl)propane having a melting point of about 75° C.

References Cited

UNITED STATES PATENTS

| | | | |
|---|---|---|---|
| 2,824,845 | 2/1958 | Kosmin | 260—327 |
| 2,965,651 | 12/1960 | Kosmin | 260—327 |
| 3,016,362 | 1/1962 | Wismer | 260—47 |
| 2,949,474 | 8/1960 | Murdock et al. | 260—79.7 |
| 2,962,457 | 11/1960 | Mackinney | 260—327 |

OTHER REFERENCES

Pacquin Epoxydverbindungen and Epoxydharze, pp. 50–61, Springer-Verlag (1958).

JOSEPH L. SCHOFER, *Primary Examiner.*

LOUIS P. QUAST, *Examiner.*

J. F. McNALLY, D. K. DENENBERG,
*Assistant Examiners.*